June 17, 1930.  W. H. EDWARDS  1,764,615
TRUCK BODY PARTITION
Filed March 12, 1928
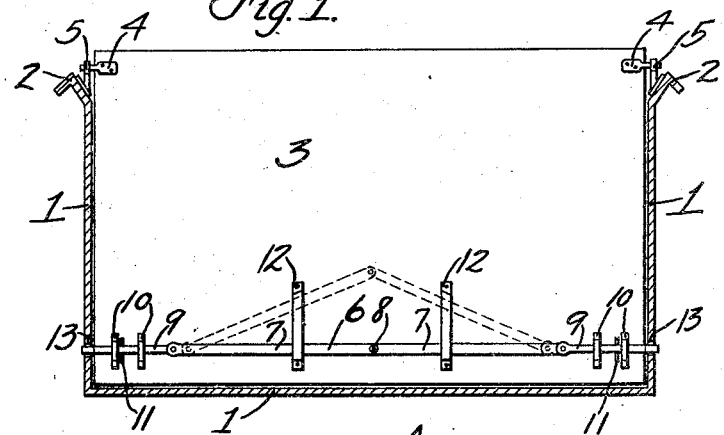
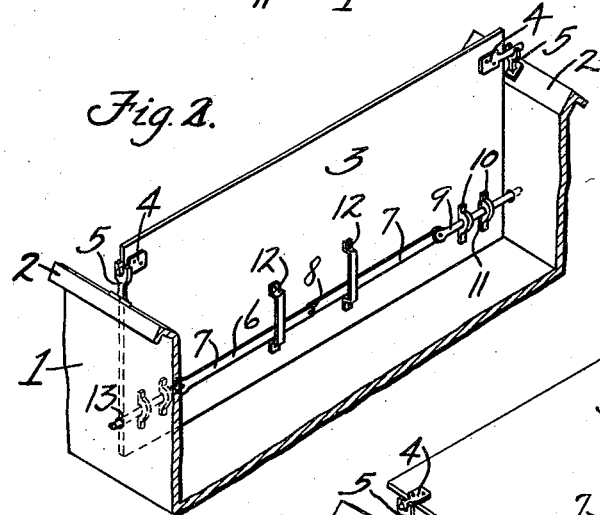
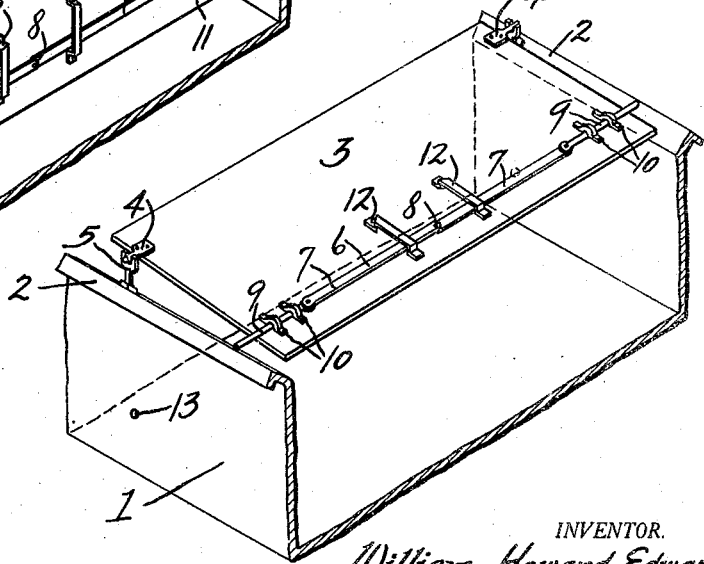
INVENTOR.
William Howard Edwards.
BY
ATTORNEY.

Patented June 17, 1930

1,764,615

UNITED STATES PATENT OFFICE

WILLIAM HOWARD EDWARDS, OF SOUTH BEND, INDIANA, ASSIGNOR TO EDWARDS IRON WORKS, INCORPORATED, OF SOUTH BEND, INDIANA

TRUCK-BODY PARTITION

Application filed March 12, 1928. Serial No. 261,080.

The invention relates to truck body partitions, particularly of the type used in coal and ice trucks, and has for its object to provide a device of this character which is removable, and which may be removed by a person standing on the ground behind the truck without climbing into the truck.

A further object is to provide a device of this character whose upper end is pivotally carried by the edges of the truck body sides, so that the partition may be pivoted, and to provide means whereby the partition may be held in the horizontal position to allow access with a shovel to the contents of the body from beneath the partition and without removing the partition from the truck body.

A further object is to provide a device of this character having means whereby the partition may be swung and secured in either a vertical or horizontal position with relation to the truck body.

A further object is to provide a partition which is simple and substantial of construction, cheap to manufacture, and which may be easily and readily removed entirely from the body, or swung to and held in a horizontal position.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the device.

Figure 2 is a perspective view of a portion of the truck body with the partition therein in the vertical or closed position.

Figure 3 is a perspective view of a portion of the truck body with the partition therein in the horizontal or open position.

Referring to the drawing, the numeral 1 designates the truck body, which is preferably of sheet metal construction, having the upper edges of the sides thereof angularly and outwardly bent to form flanges 2. Transversely disposed in the truck body is a partition 3, which is also preferably of sheet metal construction, and which is of a size to freely fit into the truck body. Adjacent the upper edge and at each end of the partition 3 are secured pin members 4, which are preferably spot welded to the partition 3. The pin members 4 extend outwardly from the partition 3 and are adapted to rest in U-shaped members 5, which are carried by the flanges 2 of the truck body sides. Horizontally across the partition 3, and near the bottom thereof, is disposed a shiftable linked member 6, which is preferably made of two flat metal bars 7 of equal length pivotally secured together at 8, the point 8 being equidistant from the opposite ends of the partition 3. Pivotally secured to the members 7 at the outer ends thereof are round metal lock bolts 9, which are adapted to extend beyond the ends of the partition 3 when the parts comprising the member 6 are moved to horizontal or aligned position. The lock bolts 9 are held in place by the bracket members 10 which are disposed in sets of two near each end of the partition 3. Stop pins 11 are carried by the lock bolts 9 at points between the brackets 10 of each set, so that the amount of lateral movement which the lock bolts 9 may have will be limited to the distance between the brackets in each set.

Spaced apart and equidistant from the ends of the partition 3 are disposed the brackets 12, which limit the amount of vertical movement which the members 7 may have. The brackets 10 and 12 are preferably secured to the partition 3 by spot welding. When the parts comprising the securing member 6 are in horizontal alignment, and the partition 3 is in a vertical position, the projected ends of the lock bolts 9 will be received in the holes 13 in the sides of the truck body.

In using the partition 3, it is disposed vertically within the truck body with the pins 4 resting in the members 5. The securing member 6 is operated so that the ends of the lock bolts 9 will be shifted into the holes 13 in the sides of the truck body 1, and thus secure the partition against forward and rearward pivotal movement. The position set out above is the operative position of the device. When it is desired to obtain access to the contents of the body in front of the partition 3, it is not necessary to remove the partition, but the same may be raised to the position shown in Figure 3, to permit which, the lock bolts 9 may be previously withdrawn from the holes 13 in the sides of the truck body. It will be noted that a man can stand behind the truck and raise the bars 7 with a shovel, using the body bottom as a fulcrum, and thus the necessity of climbing into the body to entirely remove the partition from the body is obviated.

After the lock bolts 9 have been withdrawn from the holes 13, the partition 3 may be swung on the pins 4 supported by the members 5, to a horizontal position, as shown in Figure 3. When the partition has thus been swung to a horizontal position, the linking parts are again operated so that the locking bolts 9 protrude beyond the ends of the partition and rest upon the flanges 2 of the truck body, thus holding the partition 3 in horizontal position. With the partition so held in a horizontal position, access can be had to the contents of the body in the front portion thereof by a man using a shovel and standing on the ground behind the truck, and the contents, such as coal, may be shoveled out beneath the horizontally held partition, thus obviating the necessity, otherwise, of entirely removing the partition for the purpose. It will also be observed that the partition may be entirely removed from the truck body with ease by withdrawing the securing lock bolts 9 from the holes 13 and lifting the partition to take the pins 4 out of the keeper members 5, which withdrawal of the locking pins and lifting action may be conveniently accomplished in one movement, as for example, by applying the end of a shovel beneath the bars 7 and applying a continuous lifting action until the pins 4 clear the keeper members 5.

From the above it will be seen that a truck body partition is provided which is securely held in operative position; which can be pivoted and held in a horizontal position so as to allow access to the contents of the body from beneath the partition, as by the use of a shovel slid along the body bottom; and which is simple and substantial of construction and easily manipulated for the purpose intended.

The invention having been set forth, what is claimed as new and useful is:

1. The combination with a truck body having apertures in the opposite sides thereof, of a detachable partition pivotally mounted in said truck body, keeper brackets carried by said partition, shiftable pivotally connected link members carried by said brackets, lock bolts pivotally connected to the outer ends of said link members and shiftable for engagement with said apertures upon vertical movement of the link members, said brackets being adapted to limit the pivotal movement of said link members whereby upon application of force upwardly applied against said members the lock bolts will be withdrawn from the apertures and the partition lifted free from its pivot.

2. The combination with a truck body having apertures in the opposite sides thereof, of a partition pivotally supported in said truck body and detachable from its pivotal support by an upward movement of the partition, brackets carried by said partition, pivotally connected link members carried by said brackets, lock bolts pivotally connected to the outer ends of said link members and adapted to be received in said apertures, said brackets limiting the upward movement of the link members whereby a continued lifting action on the link member serves to withdraw the locking bolts and to release the partition from its pivotal support.

In testimony whereof I affix my signature.

WILLIAM HOWARD EDWARDS.